United States Patent [19]

Hitch

[11] 3,861,259

[45] Jan. 21, 1975

[54] SHEET DELIVERY SYSTEM
[75] Inventor: Thomas R. Hitch, Aldan, Pa.
[73] Assignee: Harris-Intertype Corporation, Cleveland, Ohio
[22] Filed: June 4, 1973
[21] Appl. No.: 367,034

[52] U.S. Cl. .................... 83/106, 83/110, 83/152, 271/64, 271/197
[51] Int. Cl. ............................................ B65h 29/62
[58] Field of Search ........ 211/64, 197; 83/106, 112, 83/152, 110

[56] References Cited
UNITED STATES PATENTS
2,251,596  8/1941  O'Malley .......................... 271/64 X
2,540,972  2/1951  Wagner et al. .................... 271/64 X
2,813,637  11/1957  Perry et al. .......................... 271/64
3,288,462  11/1966  Liva ................................... 271/64 X
3,310,169  3/1967  Forrester ........................... 271/64 X Primary Examiner—Evon C. Blunk
Assistant Examiner—Bruce H. Stoner, Jr.
Attorney, Agent, or Firm—Seidel, Gonda & Goldhammer

[57] ABSTRACT

Sheets are cut from a web and then diverted either to the lower surface of a vacuum conveyor for delivery to a first take-off conveyor or to the upper surface of another conveyor for delivery to a different take-off conveyor.

10 Claims, 6 Drawing Figures

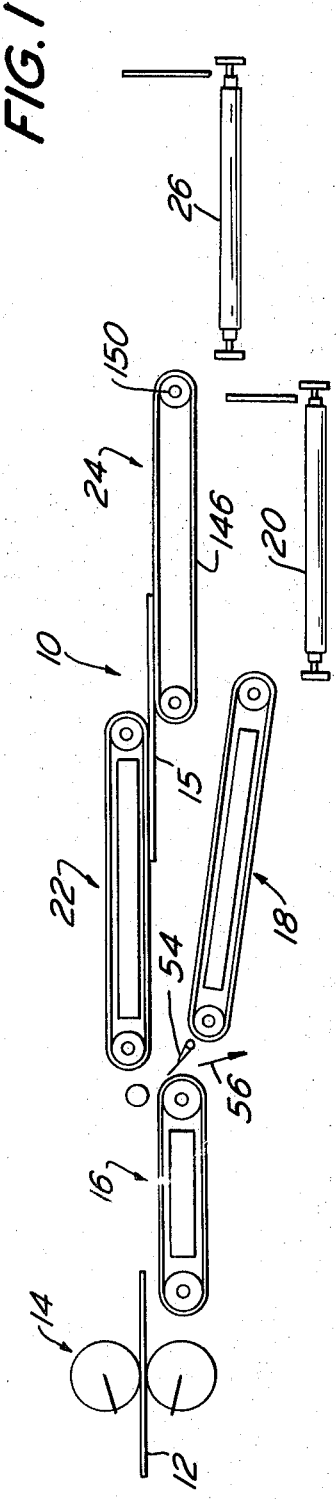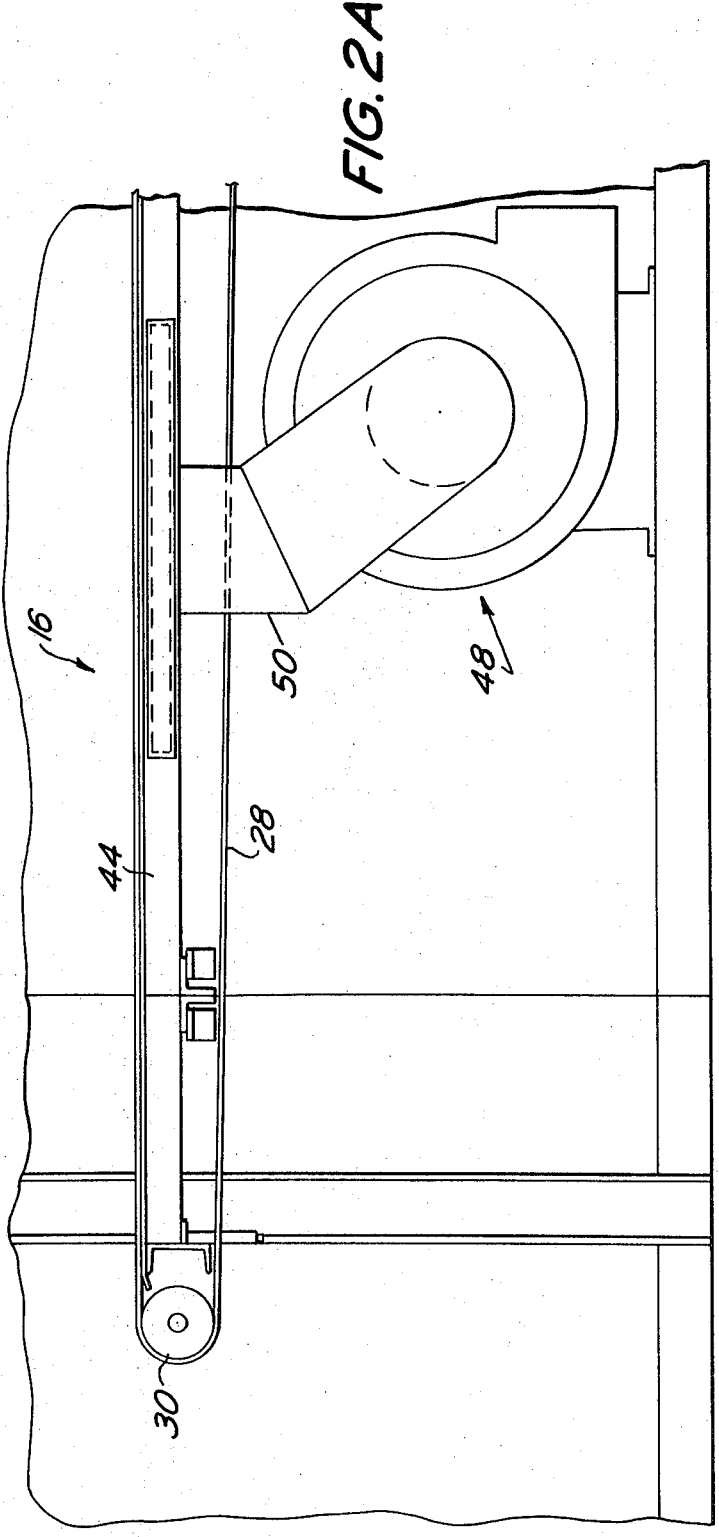

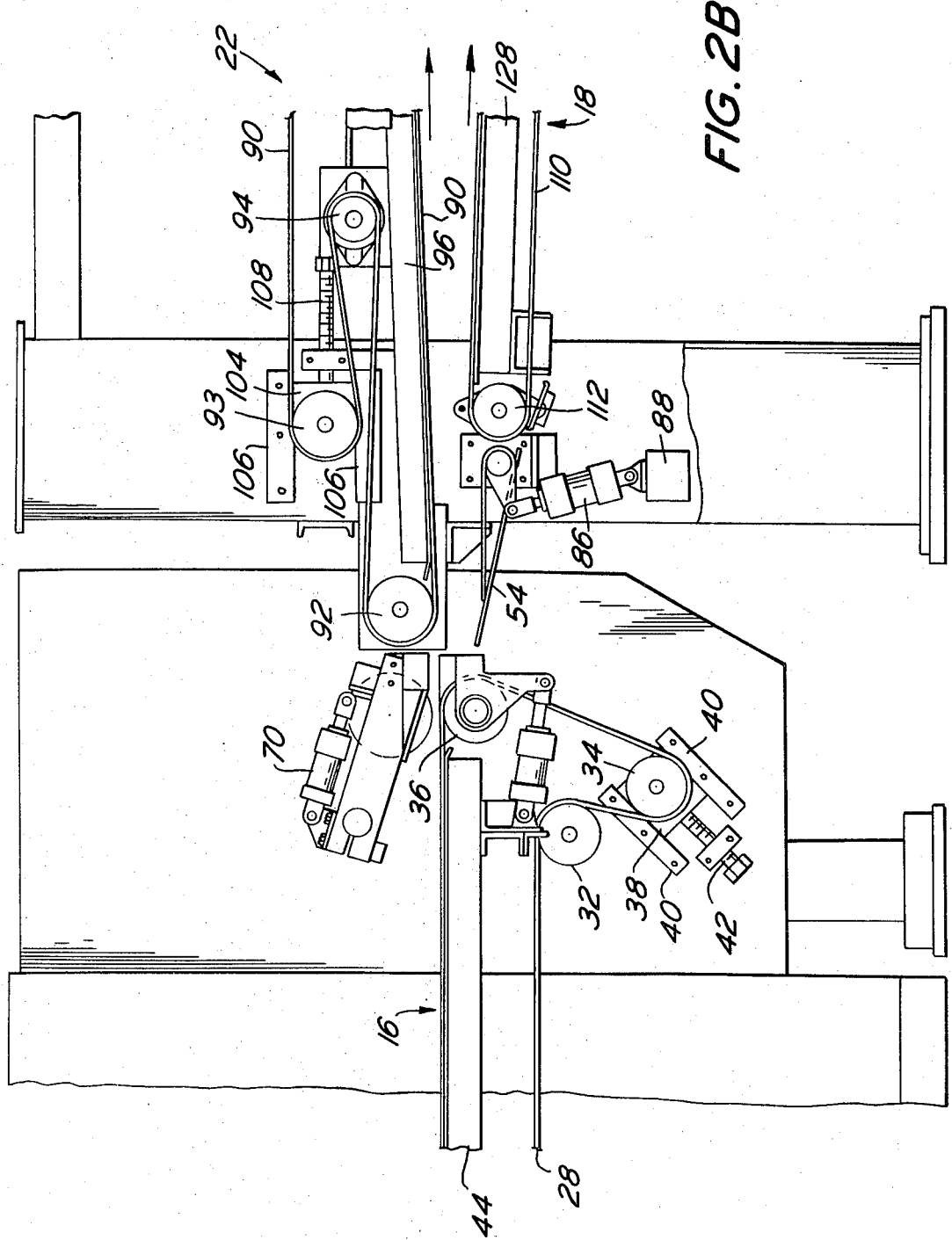

SHEET DELIVERY SYSTEM

The present invention is directed to a sheet delivery system which is constructed and arranged to direct a predetermined number of sheets from a cut-off into a preselected one of two take-off conveyors. A cut-off is a device which cuts a continuously moving web into sheets. The sheets are received on a first conveyor which advances the sheets at a faster speed than they are delivered thereto by the cut-off. The difference in speed produces a gap between the adjacent sheets.

The first conveyor delivers the sheets to one of the second and third delivery conveyors. A diverter is provided between the exit end of the first conveyor and the inlet end of the second and third conveyors. The diverter has one position wherein sheets are fed to the lower surface of the second conveyor. The diverter has another position wherein the sheets are delivered to the upper surface of the third conveyor. The diverter has a still further position wherein sheets are directed to a scrap receptacle. The diverter may be selectively positionable in accordance with conventional counting equipment which counts the number of sheets.

The first, second and third conveyors are provided with an endless perforated belt and include a vacuum chamber having holes in one wall for applying a suction through the belt to a sheet. The second and third conveyors may be parallel to one another or converging toward the diverter. The second and third conveyors deliver the sheets to take-off conveyors which direct the sheets at right angles to the previous directions of movement so that they may be stacked.

It is an object of the present invention to provide a novel sheet delivery system for dividing a flow of sheets into two paths for stacking purposes.

It is another object of the present invention to provide a sheet delivery system for spacing sheets and diverting them to one of two delivery conveyors which control movement of the sheets by use of vacuum.

It is another object of the present invention to provide a sheet delivery system wherein cut spaced apart sheets are transferred to a take-off conveyor by contact with the lower surface of a vacuum conveyor means in a manner which exercises control over the sheets.

It is another object of the present invention to provide a sheet delivery system which is simple, economical, and reliable.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a diagrammatic arrangement of the sheet delivery system of the present invention.

FIGS. 2A, B, and C are enlarged side elevation views of the conveyors illustrated in FIG. 1.

Figure 2C:
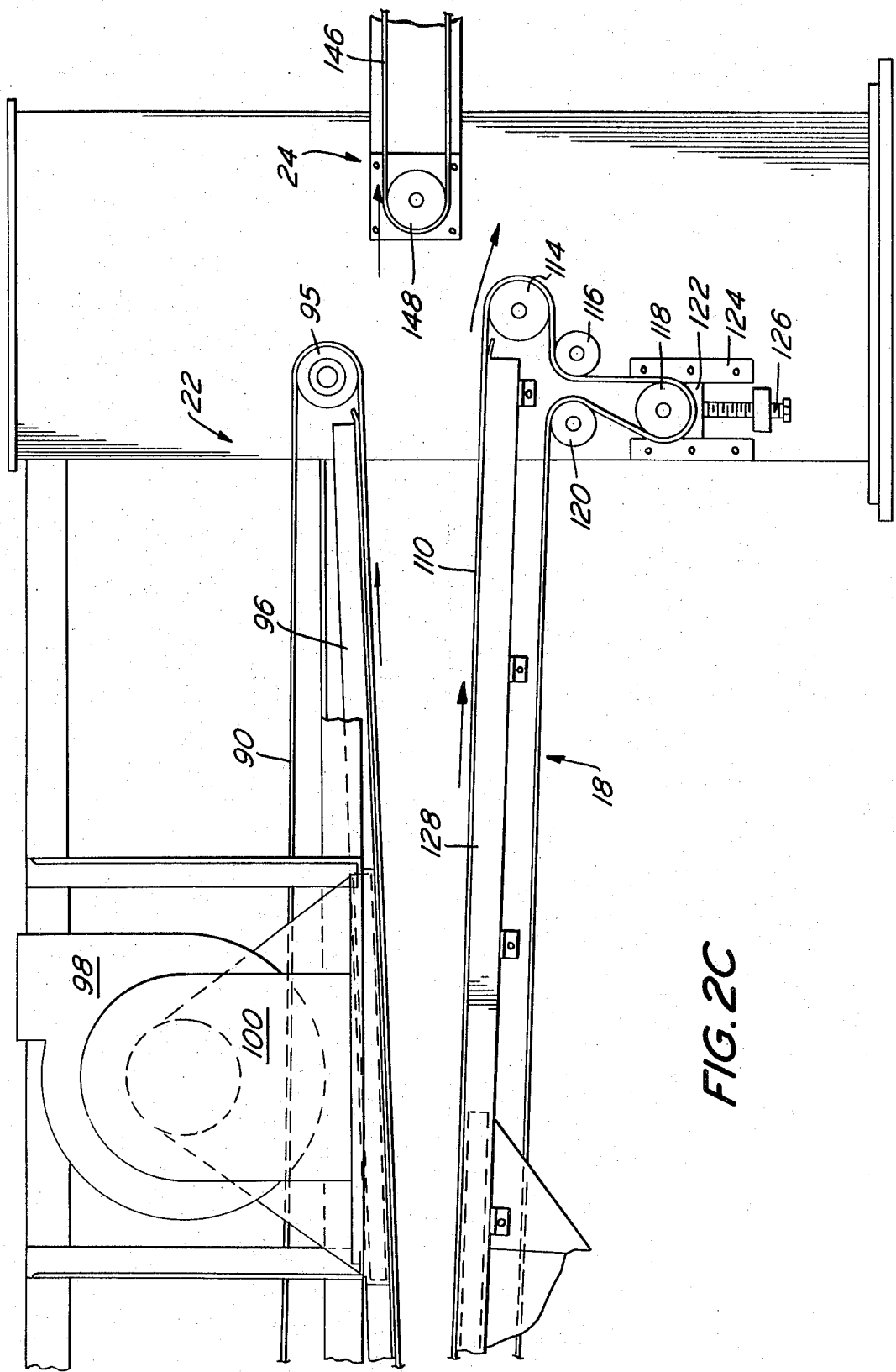

Referring to the drawings in detail, wherein like numerals indicate like elements, there is shown in FIG. 1 a sheet delivery system in accordance with the present invention designated generally as 10. The system 10 includes a cut-off designated generally as 14 which cuts a continuously moving web 12 into sheets 15. The web 12 is preferably a web of corrugated paperboard and the sheets 15 are intended to be stacked and subsequently processed for forming paperboard boxes.

The sheets 15 are deposited on a first conveyor 16. The speed of conveyor 16 is greater than the speed of the web 12. Hence, a gap forms between the leading and trailing edges of adjacent sheets 15 while they are on the conveyor 16.

Sheets 15 are transferred from conveyor 16 to the upper surface of delivery conveyor 18 or to the lower surface of delivery conveyor 22. Conveyor 18 transmits the sheets 15 to a take-off conveyor 20 for stacking. Conveyor 22 delivers the sheets 15 to a conveyor 24 which transmits them to a take-off conveyor 26 for stacking. The take-off conveyors 20 and 26 cause the sheets 15 to move in a direction transverse to their previous direction of movement. There will be noted that take-off conveyor 26 is at a higher elevation than the take-off conveyor 20 although this difference in elevation is not essential.

Referring to FIGS. 2A, B and 3, the conveyor 16 includes an endless perforated belt 28 extending around rollers 30, 32, 34 and 36. Any one of said rollers 30–36 may be a drive roller with the remaining rollers being idler rollers. The journals of roller 34 are connected to plates 38 (only one shown). Each of the plates 38 are provided with guides 40 and a threaded shaft 42. Rotation of shaft 42 causes the plate 38 to move along the guides 40 to increase or decrease the tension of belt 28.

A housing 44 is provided between the upper and lower runs of the belt 28. Housing 44 has transversely elongated holes 46 in its upper surface adjacent to the upper run of the perforated belt 28. A vacuum pump 48 is connected to the interior of the housing 44 by way of conduit 50.

Adjacent the exit end of the conveyor 16, there is provided a diverter device designated generally as 52. See FIG. 3. The diverter device 52 is adapted to divert the cut sheets 15 to the lower surface of delivery conveyor 22, or to the upper surface of delivery conveyor 18, or to a scrap receptacle in the direction of arrow 56 when scrap reject gate 54 is actuated as made clear hereinafter. The diverter device 52 includes upper and lower plates 58 and 60 spaced from one another so as to define a gap through which the sheets 15 are caused to move. The upper plate 58 is provided with an inclined extension or flange 62. See FIG. 3.

The upper plate 58 is connected to a bell crank 64 which pivots about the longitudinal axis of transverse shaft 66. One end of the bell crank 64 is pivotably connected to one end of a piston rod 68. The piston rod 68 is connected to a piston within cylinder 70. The end of the cylinder 70 remote from the bell crank 64 is pivotably supported for limited rotation about the longitudinal axis of pin 71.

Figure 3:
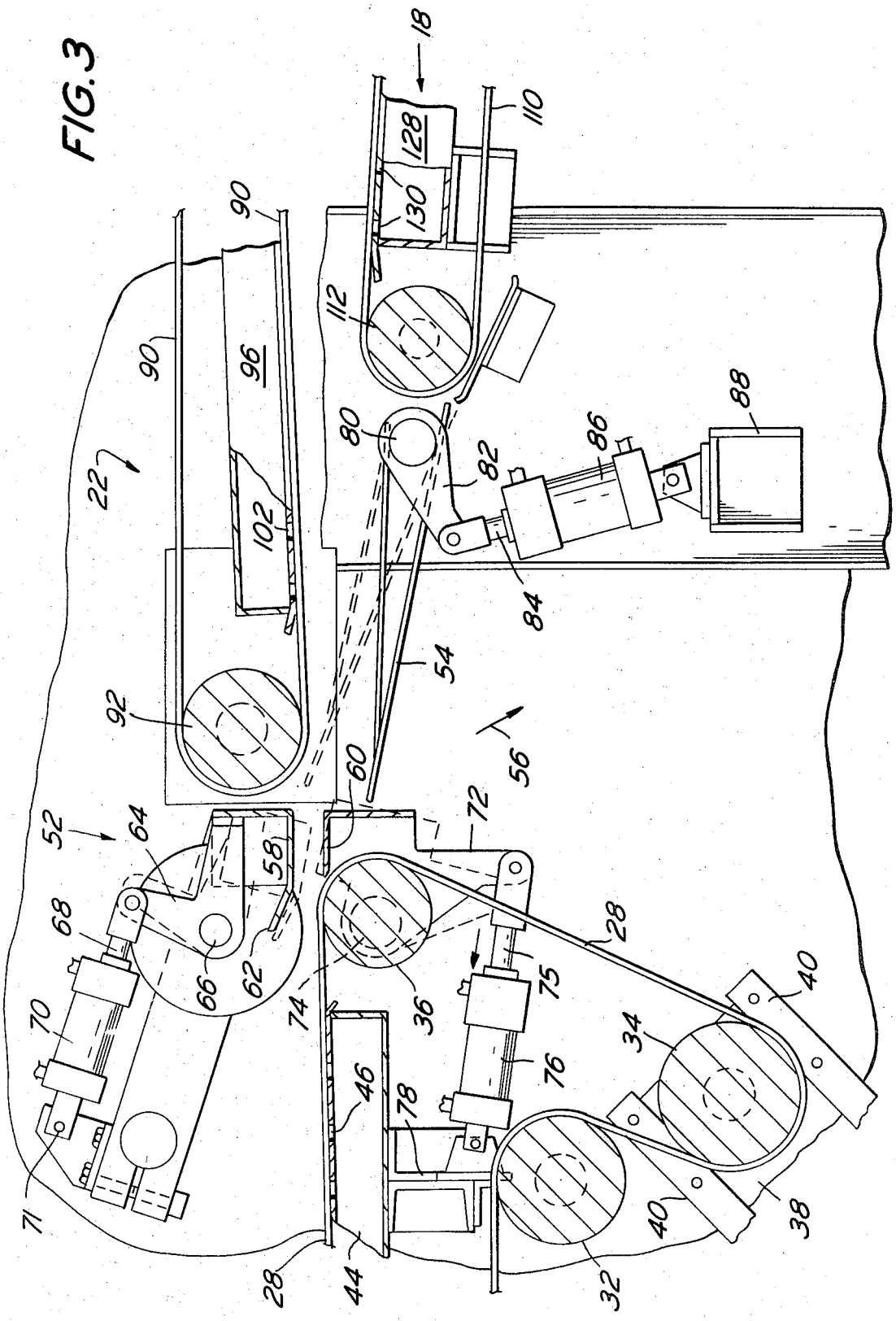
FIG. 3 is an enlarged sectional view showing details of the diverter and its relationship to the first, second and third conveyors.

The lower plate 60 is connected to bell crank 72 mounted for rotational movement about the longitudinal axis of shaft 74 on which is mounted the roller 36. The rotation of bell crank 72 is independent of rotation of roller 36. One end of the bell crank 72 is pivotably connected to one end of piston rod 75. The piston rod 75 is connected to a piston within cylinder 76. The left-hand end of cylinder 76 in FIG. 3 is pivotably connected to a transverse beam 78. Conduits are provided for the cylinders 70 and 76 so that they operate in unison to cause the plates 58 and 60 to pivot to the phantom position shown in FIG. 3. When the plates 58 and 60 pivot, piston rod 75 moves to the left in FIG. 3 while piston rod 68 moves to the right in FIG. 3.

The scrap reject gate 54 is connected to a transverse shaft 80. Shaft 80 is rotated about its longitudinal axis by means of lever arm 82. The free end of lever arm 82 is pivotably connected to one end of the piston rod 84. The piston rod 84 is connected to a piston within cylinder 86. The lower end of cylinder 86 is pivotably mounted on a transverse beam 88.

Referring to FIGS. 2B, 2C and 3, the delivery conveyor 22 includes an endless perforated belt 90 extending around rollers 92, 93, 94 and 95. A housing between the upper and lower runs of the belt 90 is connected to a vacuum pump 98 by way of a conduit 100. The lower surface of the housing 96, which is juxtaposed to the lower run of the belt 90, is provided with transversely elongated holes 102.

Referring to FIG. 2B, it will be noted that the idler roller 93 has its journals supported by plates 104 (only one plate shown). The plates 104 are guided for reciprocal movement by the guides 106. A threaded shaft 108 is connected to each plate 104. Rotation of the threaded shafts 108 increases or decreases the tension in the belt 90. Any one of the rollers 92, 94 or 95 may be the drive roller.

The delivery conveyor 18 includes an endless perforated belt 110 extending around rollers 112, 114, 116, 118 and 120. See FIGS. 2B and 2C. The journals of roller 118 are supported by plates 122. Only one such plate 122 is shown. Plate 122 is provided with guide plates 124 and connected to a threaded shaft 126. Rotation of shaft 126 increases or decreases the tension in the belt 110.

Figure 4:
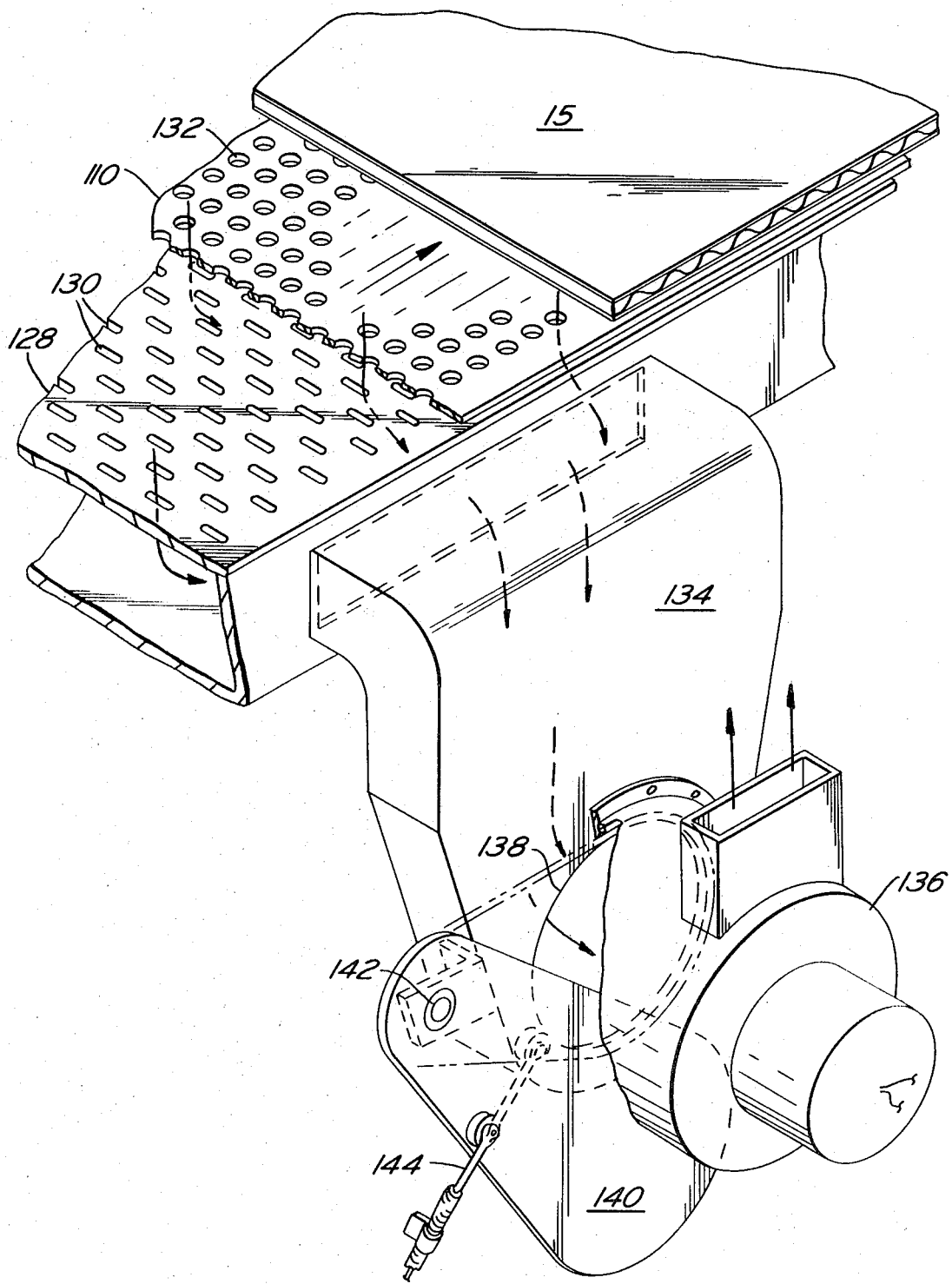
FIG. 4 is a partial perspective view of the third conveyor and its associated means for creating a vacuum.

A housing 128 is provided between the upper and lower runs of the belt 110. The upper surface of housing 128 is provided with transversely elongated holes 130. See FIG. 4. The belt 110 is provided with discrete circular perforations 132. The holes 130 are in transverse rows and are staggered with respect to each other. The holes 46 in housing 44 as well as the holes 102 in housing 96 cooperate with discrete perforations in their respective belts in the same manner as that illustrated in FIG. 4.

The interior of housing 128 is connected to a vacuum pump 136 by way of conduit 134. Conduit 134 communicates with pump 136 by way of a port 138. A valve plate 140 is pivotably mounted for rotation about the axis of pin 142 to control the flow through port 138. Valve plate 140 is provided with an actuator 144.

The transfer conveyor 24 includes an endless belt 146 extending around an idler roller 148 and a drive roller 150. The exit end of the delivery conveyor 22 is spaced from the inlet end of the conveyor 24 by a gap as shown in FIG. 2C which is less than the length of the sheets 15. Conveyors 16, 18, 22 and 24 are aligned with one another. Conveyor 18 is directly below conveyor 22.

The operation of the sheet delivery system 10 is as follows:

A continuously moving web 12 is cut at the cut-off 14 to produce the sheets 15. The cut sheets 15 are deposited onto the conveyor 16. Conveyor 16 operates at a speed which is in excess of the speed of web 12 so as to produce a gap between the leading and trailing edges of adjacent sheets 15. Positive control over the sheets 15 and the gap is maintained by the suction applied to the sheets 15 through the holes 46 and the perforations in belt 28.

The sheets 15 are moved one at a time through the diverter device 52. In the position of the device 52 as shown in FIG. 3, the sheet 15 of corrugated paperboard has sufficient stiffness so as to project under and be immediately adhered to the lower surface of belt 90 on conveyor 22. Delivery conveyor 22 deposits the sheets 15 onto the upper surface of the transfer conveyor 24. From the conveyor 24, the sheets 15 are deposited into a hopper of the take-off conveyor 26. Take-off conveyor 26 moves the sheets in a spaced or shingled arrangement in a direction transverse to the direction of the conveyors 16, 22 and 24 to a stacking device.

After a predetermined number of sheets has been delivered to the take-off conveyor 26, a conventional timing device, not shown, will cause the cylinders 70 and 76 to rotate the plates 58 and 60 of the diverter device 52 at a gap between adjacent sheets whereby the subsequent sheets will then be deposited onto the upper surface of the delivery conveyor 18. The suction effect transmitted from the pump 136 through the holes 130 and 132 maintain a predetermined relationship between adjacent sheets 15. The sheets 15 are then transferred to the take-off conveyor 20. While sheets 15 are being fed to the take-off conveyor 20, a previously formed stack of sheets 15 associated with take-off conveyor 26 is being removed and a new pallet or other device provided therewith whereby sheets 15 may again be fed to the take-off conveyor 26.

On occasion, the sheets 15 are improperly cut, include the seam between two webs 12 which have been joined together, etc. Such sheets 15 are not to be stacked but rather diverted in the direction of arrow 56 to a scrap bin. Under these circumstances, the diverter device 52 is caused to move to the operative position wherein sheets would normally be directed onto delivery conveyor 18. Also, cylinder 86 is activated so as to cause the gate 54 to move to the phantom position shown in FIG. 3. The sheets 15 will glance off the gate 54 and be directed downwardly to a scrap bin in the direction of arrow 56. The controls for causing the sheets 15 to be scrapped may be manual or automatic as is desired.

Each of the conveyors 16, 18 and 22 includes suction means for maintaining a predetermined relationship between the leading and trailing edges of adjacent blanks or sheets 15 to facilitate control of the sheets 15 and prevent relative movement between the sheets 15 and the conveyor belt in contact therewith. Due to the stiffness in corrugated paperboard sheets 15, they may be delivered from conveyor 16 to conveyor 24 by the lowermost surface of the conveyor 22. The housing 96, between the upper and lower runs of the belt 90, is preferably located so as to be immediately adjacent the roller 92 whereby the sheets 15 need not project very far before coming under the influence of the suction effect of conveyor 22. As shown more clearly in FIG. 3, conveyors 16 and 22 are inclined upwardly and spaced so that the upper surface of the sheets 15 will be immediately adjacent the belt 90 as the sheets 15 move through the gap between the plates 58 and 60 in the operative disposition of the diverter device 52 as shown in FIG. 3.

The present invention may be embodied in other specific forms without departing from the spirit or essential attributes thereof and, accordingly, reference should be made to the appended claims, rather than to the foregoing specification as indicating the scope of the invention.

I claim:

1. A sheet delivery system comprising means for cutting a web into sheets, a first conveyor for removing the cut sheets at a speed so that a gap develops between adjacent sheets thereon, second and third conveyors for transferring sheets from said first conveyor to one of a pair of take-off conveyors, a movable selectively operable diverter, said diverter being between the exit end of said first conveyor and the inlet end of said second and third conveyors, said diverter having one position wherein sheets are transferred from said first conveyor to a lower surface on said second conveyor and another position wherein sheets are transferred to the upper surface of said third conveyor, vacuum means associated with each of said conveyors, each of said conveyors including an endless perforated conveyor belt, the vacuum means associated with said second conveyor being arranged to retain sheets on the lower run of its belt, the vacuum means associated with said first and third conveyors being arranged to retain sheets on the upper run of their belts, and means associated with each vacuum means for creating a negative pressure through said belts.

2. A sheet delivery system in accordance with claim 1 wherein said diverter includes first and second plates spaced from one another so as to define a gap, and means supporting said plates for movement in unison to cause sheets to be transferred from said first conveyor to either said second conveyor or said third conveyor.

3. A sheet delivery system in accordance with claim 2 wherein said first and second plates are mounted for pivotable movement about a transverse axis.

4. A sheet delivery system in accordance with claim 2 wherein the upper one of said plates at its upstream end is provided with an extension extending upwardly at an acute angle.

5. A sheet delivery system in accordance with claim 1 wherein the exit end of said second conveyor is at a higher elevation than the inlet end of said second conveyor.

6. A system in accordance with claim 1 wherein said diverter includes upper and lower plates spaced from one another, means connected to said plates for moving said plates in unison to change the elevation of the gap between said plates to a position wherein sheets exiting from the first conveyor are spaced sufficiently from the lower surface of the first conveyor so as not to be affected by the vacuum associated with said second conveyor.

7. A system in accordance with claim 1 wherein said first and second conveyors are generally parallel and inclined upwardly beginning at their respective inlet ends.

8. A sheet delivery system comprising means for cutting a web into sheets, a first conveyor for removing cut sheets so that a gap develops between adjacent sheets thereon, second and third conveyors for transferring sheets from said first conveyor to one of a pair of take-off conveyors, a movable selectively operable diverter, said diverter being between the exit end of said first conveyor and the inlet end of said second and third conveyors, said diverter having one position wherein sheets are transferred from said first conveyor to a lower surface on said second conveyor, vacuum means associated with said second conveyor to retain sheets on its lower surface, said diverter having another position wherein sheets are transferred from said first conveyor to said third conveyor, and a pivotably mounted scrap reject gate between the diverter and the inlet end of said third conveyor.

9. A sheet delivery system comprising a first conveyor for receiving cut sheets from a cut-off device, a take-off conveyor, a second conveyor for transferring sheets from said first conveyor to said take-off conveyor, said first and second conveyors being oriented so that sheets may be transferred from the upper surface of said first conveyor to the lower surface of said second conveyor, said take-off conveyor being located to receive sheets from the discharge end of said second conveyor, a diverter between the exit end of said first conveyor and the inlet end of said second conveyor for selectively interrupting transfer of sheets from said first conveyor to said second conveyor, said second conveyor including an endless belt and a housing between upper and lower runs of the belt, the lower surface of said housing being provided with holes, said belt being perforated, a third conveyor positioned below the elevation of said second conveyor, the inlet end of said second conveyor being closer to said diverter as compared with the inlet end of said third conveyor and said diverter having a position wherein sheets may be transferred from the upper surface of the first conveyor to the upper surface of the third conveyor, said third conveyor including an endless perforated belt with a housing between the upper and lower runs thereof, said last mentioned housing having holes on its upper surface, means for creating a vacuum in each of said housings, and a scrap reject gate below the inlet of said second conveyor for selectively diverting sheets from said first conveyor out of the sheet delivery system.

10. A system in accordance with claim 9 wherein each perforated belt includes rows of discrete perforations in the belt, and said housing holes being elongated in a transverse direction.

* * * * *